United States Patent
Hu et al.

(10) Patent No.: US 12,461,516 B2
(45) Date of Patent: Nov. 4, 2025

(54) ABNORMALITY DETECTION DEVICE (71) Applicant: FANUC CORPORATION, Yamanashi (JP)

(72) Inventors: Liancheng Hu, Yamanashi (JP); Kazuhiro Satou, Yamanashi (JP); Kazunori Iijima, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 405 days.

(21) Appl. No.: 18/004,301

(22) PCT Filed: Jul. 19, 2021

(86) PCT No.: PCT/JP2021/026911
§ 371 (c)(1),
(2) Date: Jan. 5, 2023

(87) PCT Pub. No.: WO2022/019249
PCT Pub. Date: Jan. 27, 2022

(65) Prior Publication Data
US 2023/0251645 A1 Aug. 10, 2023

(30) Foreign Application Priority Data
Jul. 21, 2020 (JP) .................. 2020-124645

(51) Int. Cl.
G05B 23/02 (2006.01)
B23Q 17/00 (2006.01)

(52) U.S. Cl.
CPC ......... *G05B 23/0267* (2013.01); *B23Q 17/00* (2013.01); *G05B 23/024* (2013.01)

(58) Field of Classification Search
CPC .............. G05B 23/0267; G05B 23/024; G05B 19/4062; B23Q 17/00
See application file for complete search history.

(56) References Cited

U.S. PATENT DOCUMENTS 5,142,210 A * 8/1992 Kojima .............. G05B 19/4062
318/275
2009/0228137 A1 9/2009 Meidar et al.
(Continued)

FOREIGN PATENT DOCUMENTS

CN 109909803 A 6/2019
JP 04325919 A * 11/1992
(Continued)

OTHER PUBLICATIONS

International Search Report in PCT/JP2021/026911, mailed Oct. 19, 2021, 2pp.

*Primary Examiner* — Mi'schita' Henson
(74) *Attorney, Agent, or Firm* — HAUPTMAN HAM, LLP (57) ABSTRACT This abnormality detection device: causes a motor that drives a drive unit at a plurality of rotational speeds to perform a detection operation based on a command for diagnosing the state of the drive unit, acquires, as information indicating the operating state of the drive unit, a control command for the motor driving the drive unit or a feedback signal from the motor driving the drive unit, during the detection operation; analyzes the control instruction for the motor driving the drive unit or the feedback signal from the motor; determines the state of the drive unit based on the result of the analysis, and notifies, based on the determination result, that the state of the drive unit is different from that in normal time.

6 Claims, 5 Drawing Sheets (56) References Cited

U.S. PATENT DOCUMENTS

2019/0294144 A1* 9/2019 Takahara ........... G05B 23/0221
2019/0353563 A1   11/2019 Nishino
2021/0157312 A1*  5/2021 Cella ................... G01M 13/045

FOREIGN PATENT DOCUMENTS

| JP | H985585 A | 3/1997 | |
|----|-----------|--------|---|
| JP | 2006-234786 A | 9/2006 | |
| JP | 2008-087094 A | 4/2008 | |
| JP | 201640072 A | 3/2016 | |
| JP | 201840456 A | 3/2018 | |
| JP | 2018040456 A * | 3/2018 | |
| JP | 2019034345 A * | 3/2019 | |
| JP | 2019-188540 A | 10/2019 | |
| JP | 2020104257 A | 7/2020 | |
| WO | WO-2016036047 A1 * | 3/2016 | ............ B23Q 15/00 |
| WO | 2018146733 A1 | 8/2018 | |
| WO | 2020067065 A1 | 4/2020 | |

* cited by examiner

ABNORMALITY DETECTION DEVICE

RELATED APPLICATIONS

The present application is a National Phase of International Application No. PCT/JP2021/026911 filed Jul. 19, 2021, which claims priority to Japanese Application No. 2020-124645, filed Jul. 21, 2020.

TECHNICAL FIELD

The present invention relates to an abnormality detection device, in particular to an abnormality detection device that detects a foreign matter getting caught in a drive unit of a machine tool.

BACKGROUND ART

A machine tool is for machining a workpiece by a tool attached to a spindle. The machining of a workpiece produces chips, metallic powder, etc. Furthermore, during workpiece machining, the tool attached to the spindle is replaced according to a machining process or due to wear, breakage or others of the tool.

When a tool is replaced in a machine tool, chips, metallic powder or others may get caught between a tapered surface and a shank. If the chips, metallic power or others get caught between the tapered surface and the shank, the tool is clamped inaccurately with its position relative to a spindle differing from an original position. Thus, when machining is started and the spindle rotates at high speed in the above-described condition, it may cause damage to a cutting tool, chatter vibration that leads to quality deterioration of a machined surface, or decrease in the precision of circularity and roughness, by way of example.

In order to solve the above problem, for example, there is a detection method that is based on a change in a power value caused by the chips or others getting caught (see e.g., Patent Literature 1). There is also a method that acquires waveform data from an external detection sensor (e.g., a vibration sensor mounted on a spindle chuck) to analyze the data by artificial intelligence (AI: deep learning) (see e.g., Patent Literature 2).

PRIOR ART DOCUMENT

Patent Literature

[Patent Literature 1] Japanese Patent Laid-Open Publication No. 2016-040072
[Patent Literature 2] PCT International Publication No. 2018/146733

SUMMARY OF THE INVENTION

Problems to be Solved by the Invention

In a case where tiny chips, metallic powder or others get caught between a tapered surface and a shank, a state of a tool attached to a spindle is almost the same as that in a case where the chips or others does not get caught, except that the tool is slightly eccentric. Thus, there is a problem with a simple function of detecting an abnormality in the attachment of a tool that the function cannot automatically detect such abnormality. It is possible to provide a high-precision sensor to detect tiny foreign matters that have gotten caught. However, such sensor causes an increase in facility costs. In addition to that, it has a large influence on inspection accuracy according to an installation position of the sensor and places where the foreign matters have gotten caught, and it is necessary to analyze vibration waveforms at all times, which leads to an increase in a computational cost.

In addition to the chips getting caught, there are other abnormalities associated with the spindle, such as unevenness in workpieces and wear in the tool itself, and thus a situation where the foreign matter gets caught may not be detected accurately.

Furthermore, a similar problem arises in a case where tiny foreign matters get into a drive unit driven by a motor of a machine tool, e.g., a case where tiny chips, metallic powder or others get between a guide face of a feed axis and a drive unit and do not come out from there, or a case where the tiny chips, the metallic powder or others get caught in a groove of a ball screw nut.

Means for Solving the Problem

According to an aspect of the present invention, an abnormality detection device solves the above-described problem by monitoring a response of a spindle while performing a sensing operation by rotating a motor (spindle) at various rotational speeds, so as to detect an eccentricity of a tool based on the monitored response.

One aspect of the present invention is an abnormality detection device for detecting a foreign matter getting caught in a drive unit which is driven by a motor in a machine tool, including a control unit that causes the motor which drives the drive unit at various rotational speeds to perform a detection operation based on a command for diagnosing a state of the drive unit; a drive unit information acquiring unit that acquires a control command for the motor driving the drive unit or a feedback signal from the motor driving the drive unit as information indicating an operating state of the drive unit during the detection operation; a drive state determining unit that analyzes the control command for the motor driving the drive unit or the feedback signal from the motor driving the drive unit acquired by the drive unit information acquiring unit, and based on a result of the analysis, makes a determination about the state of the drive unit; and a notifying unit that provides a notification that the state of the drive unit is different from a state at a normal time based on a determination result made by the drive unit state determining unit.

Effect of the Invention

The aspect of the invention enables to conduct the detection of the foreign matter getting caught in the spindle with high accuracy without incurring cost for introducing a high-precision sensor and others.

MODE(S) FOR IMPLEMENTING THE INVENTION

A description will now be made about embodiments of the present invention with reference to the drawings.

Figure 1:
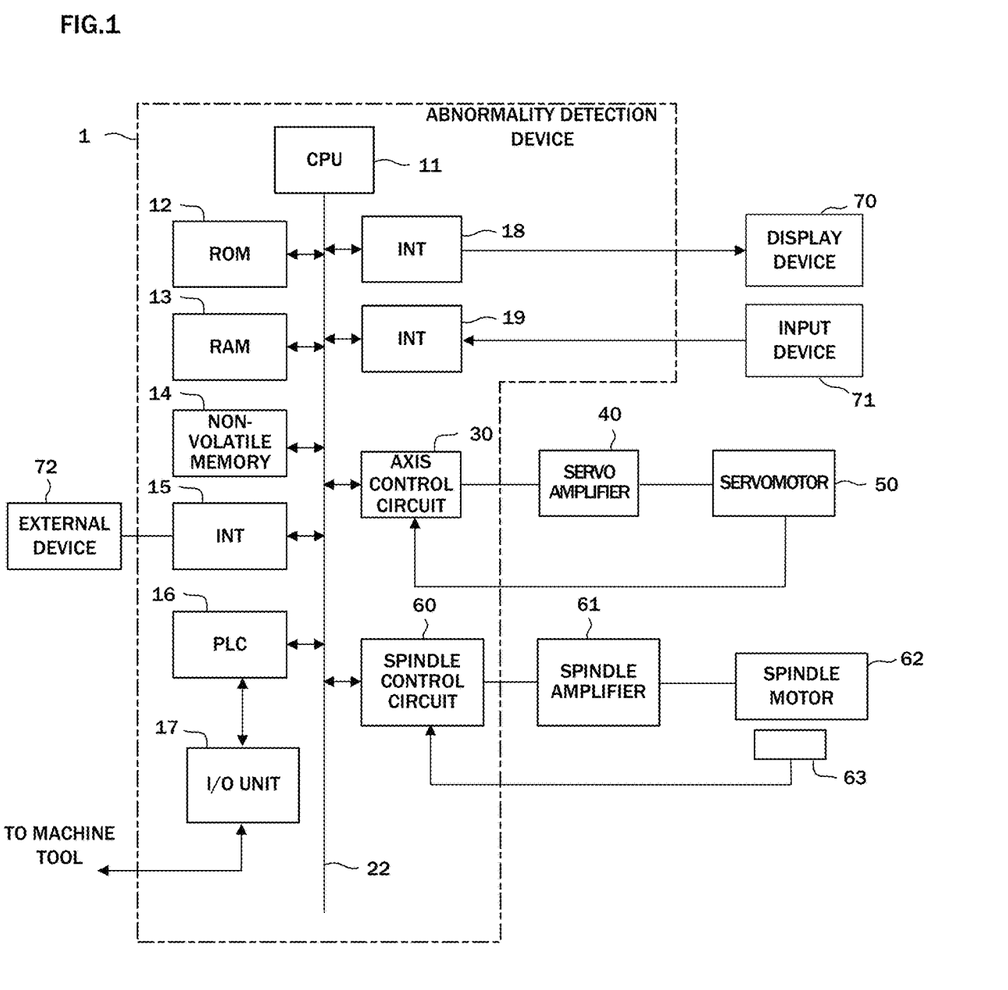
FIG. 1 is a schematic hardware configuration diagram of an abnormality detection device according to an embodiment.

FIG. 1 is a schematic hardware configuration diagram showing a main part of an abnormality detection device according to an embodiment of the invention. An abnormality detection device 1 of the invention can be implemented as, for example, a controller for controlling a machine tool, or may be implemented in a personal computer disposed together with a controller for controlling a machine tool or in an edge computer, fog computer, cloud server or similar which is connected to the controller via a wired/wireless network. The embodiment shows an example of the abnormality detection device that is implemented in a controller for controlling a machine tool.

The abnormality detection device 1 according to the invention has a central processing unit (CPU) 11 that is a processor for controlling the abnormality detection device 1 as a whole. The CPU 11 is configured to read a system program stored in a read-only memory (ROM) 12 via a bus 22 to thereby control the abnormality detection device 1 as a whole in accordance with the system program. A random-access memory (RAM) 13 is configured to temporarily store temporary computation data and pieces of data to be displayed, as well as various pieces of data input from outside.

A non-volatile memory 14 consists of, for example, a memory backed up by a battery, not shown, solid state drive (SSD) or similar and a state of storage of data written in the memory is retained even when a power source of the abnormality detection device 1 is turned off. The non-volatile memory 14 is configured to store, for example, pieces of data and a machining program read from an external device 72 via an interface 15, pieces of data and a machining program input via an input device 71, and pieces of data obtained from the machine tool. The pieces of data and the machining programs stored in the non-volatile memory 14 may be loaded into the RAM 13 during execution or use. Furthermore, the ROM 12 is configured to store beforehand various system programs, such as known analysis program.

The interface 15 is for connecting the CPU 11 in the abnormality detection device 1 to the external device 72, such as USB device. For example, a machining program and various parameters to be used in controlling the machine tool can be read from the external device 72. In addition to that, the machining program, the various parameters and others edited in the abnormality detection device 1 can be stored in external storing means via the external device 72.

A programmable logic controller (PLC) 16 is configured to output a signal by a sequence program incorporated in the abnormality detection device 1 to the machine tool and peripheral devices of the machine tool (e.g., a tool exchanger, an actuator such as robot, and sensors attached to the machine tool) via an input/output (I/O) unit 17, so as to control the machine tool and the peripheral devices. The PLC 16 is also configured to receive signals from various switches in an operation board provided to a body of an industrial machine, the peripheral devices and others, then conduct necessary signal processing, and send the signals to the CPU 11.

The pieces of data read in the memory, pieces of data obtained by executing, for example, the machining programs and the system programs and others are output via an interface 18 and displayed on a display device 70. Furthermore, the input device 71 configured with a keyboard, pointing device and others sends a command, pieces of data and others in accordance with an operation by an operator via an interface 19 to the CPU 11.

An axis control circuit 30 for controlling an axis included in the machine tool is configured to receive from the CPU 11 an amount of control command for moving a drive unit along the axis and output the command to a servo amplifier 40. Upon receipt of the command, the servo amplifier 40 drives a servomotor 50 for moving the drive unit included in the machine tool along the axis. The servomotor 50 of the axis is equipped with a position/speed detector to feed back a position/speed feedback signal obtained from the position/speed detector to the axis control circuit 30, thereby performing feedback control on a position and a speed. Even though the hardware configuration diagram in FIG. 1 shows only one axis control circuit 30, servo amplifier 40 and servomotor 50 each, these components will be provided as many as the number of axes of a machine tool to be controlled in practice. For example, in a case of controlling a common machine tool, three sets of the axis control circuit 30, the servo amplifier 40 and the servomotor 50 are provided to move a spindle to which a tool is attached and a workpiece relative to each other in directions of three linear axes (X-axis, Y-axis and Z-axis).

A spindle control circuit 60 is configured to receive a spindle rotating command and output a spindle speed signal to a spindle amplifier 61. In response to the spindle speed signal, the spindle amplifier 61 rotates a spindle motor 62 of the machine tool at a specified rotational speed to drive the tool. To the spindle motor 62, connected is a position coder 63 that is synchronized with the rotation of the spindle to output a feedback pulse, the feedback pulse being read by the CPU 11.

Figure 2:
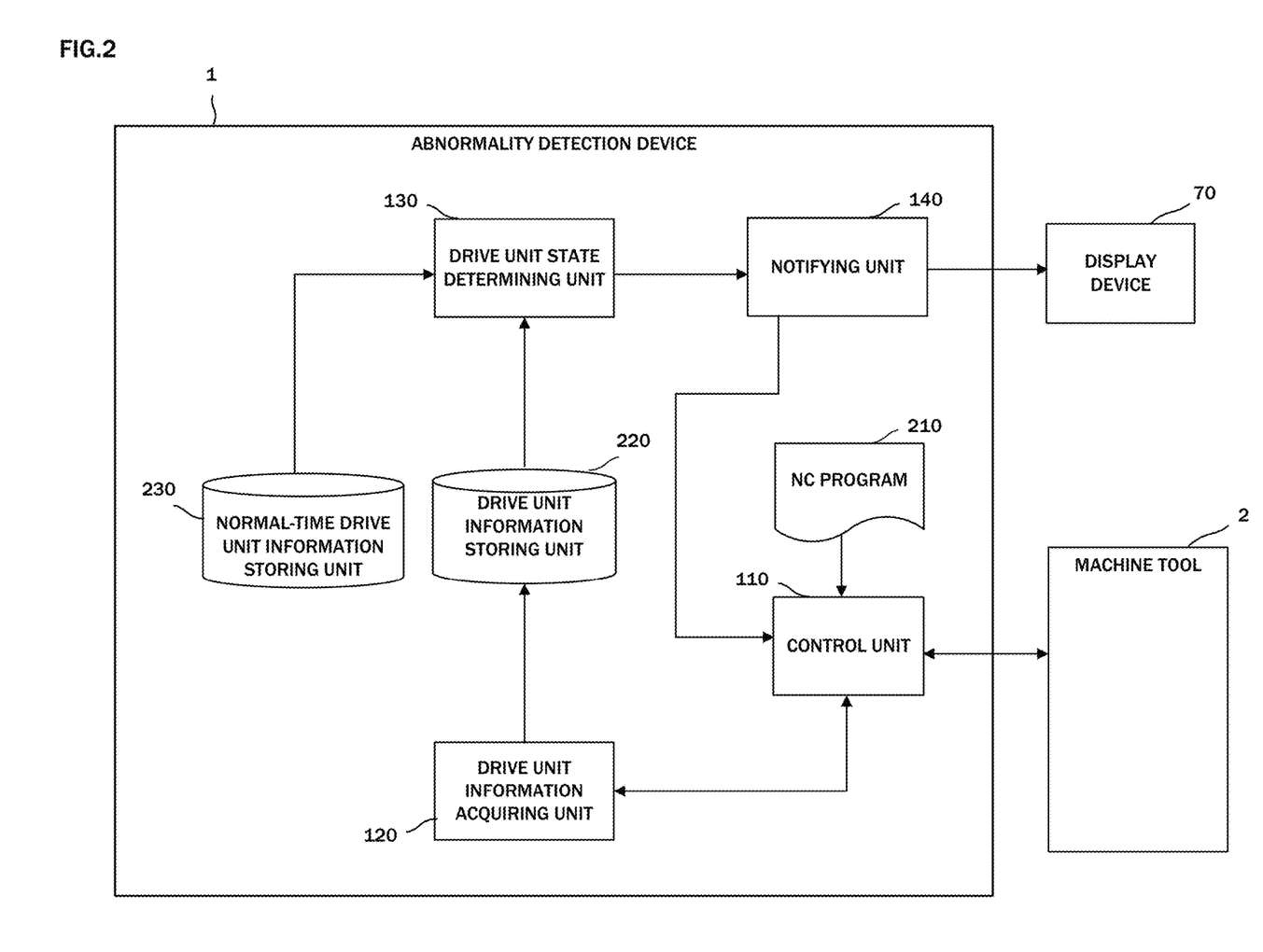
FIG. 2 is a schematic function block diagram of the abnormality detection device according to the embodiment.

FIG. 2 shows the functions of the abnormality detection device 1 according to one embodiment of the invention as a schematic block diagram. The functions of the abnormality detection device 1 according to the embodiment are implemented by executing the system programs by the CPU 11 included in the abnormality detection device 1 shown in FIG. 1 to thereby control the operations of respective units of the abnormality detection device 1.

The abnormality detection device 1 according to the embodiment has a function that focuses on the spindle as a drive unit which is driven by an electric motor of the machine tool, and operates the spindle with various speeds for the detection, and then analyzes a detection result to detect a small change that has occurred in the spindle.

The abnormality detection device 1 of the embodiment includes a control unit 110, a drive unit information acquiring unit 120, a drive unit state determining unit 130 and a notifying unit 140. In the RAM 13 or the non-volatile memory 14 of the abnormality detection device 1, an NC program 210 acquired from the input device 71, the external device 72 or others is stored in advance. In addition to that, the RAM 13 or the non-volatile memory 14 of the abnormality detection device 1 is provided in advance with a drive unit information storing unit 220 that is a storage area for storing acquired information on an operating state of the spindle serving as the drive unit and a normal-time drive unit information storing unit 230 in which information on the operating state of the spindle acquired while the spindle as the drive unit has been in the normal operation is stored in advance.

The control unit 110 is implemented in such a way that the CPU 11 included in the abnormality detection device 1 shown in FIG. 1 executes the system program read from the ROM 12, and then computation using the RAM 13 and the non-volatile memory 14 and control of the units of the machine tool 2 using the axis control circuit 30, the spindle control circuit 60 and the PLC 16 are primarily conducted by the CPU 11. The control unit 110 analyzes the NC program 210 to create command data for controlling the machine tool 2 including the servomotor 50 and the spindle motor 62 and peripheral devices of the machine tool 2. The control unit 110 controls the units of the machine tool 2 and its peripheral devices based on the created command data. For example, the control unit 110 creates pieces of data about the movements of the axis based on a command for moving the drive unit along the axis of the machine tool 2 to output the created data to the servomotor 50. In addition to that, the control unit 110 creates pieces of data about the rotation of the spindle of the machine tool 2 based on a command for rotating the spindle and outputs the created data to the spindle motor 62, for instance. Moreover, the control unit 110 produces a predetermined signal for operating the peripheral devices of the machine tool 2 based on a command for operating the peripheral devices and outputs the signal to the PLC 16, by way of example. On the other hand, the control unit 110 acquires states of the servomotor 50 and the spindle motor 62 (e.g., current values, positions, speeds, acceleration and torques of the motors) as feedback values for the use of the controlling.

Figure 3:
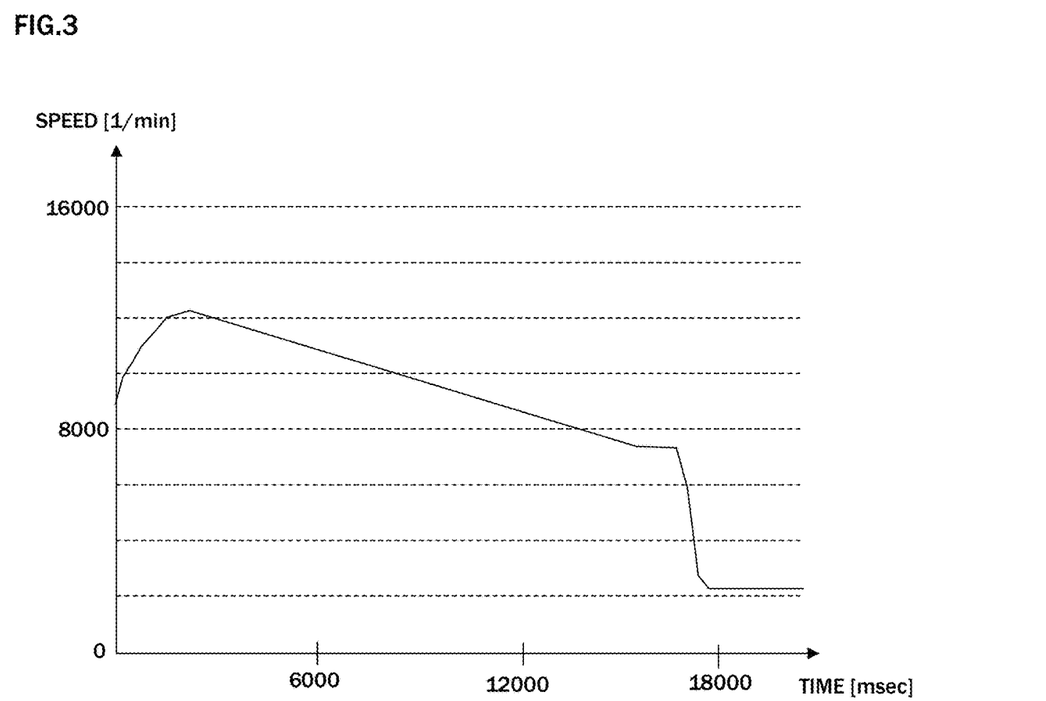
FIG. 3 shows an example of a detecting operation.
Figure 4:
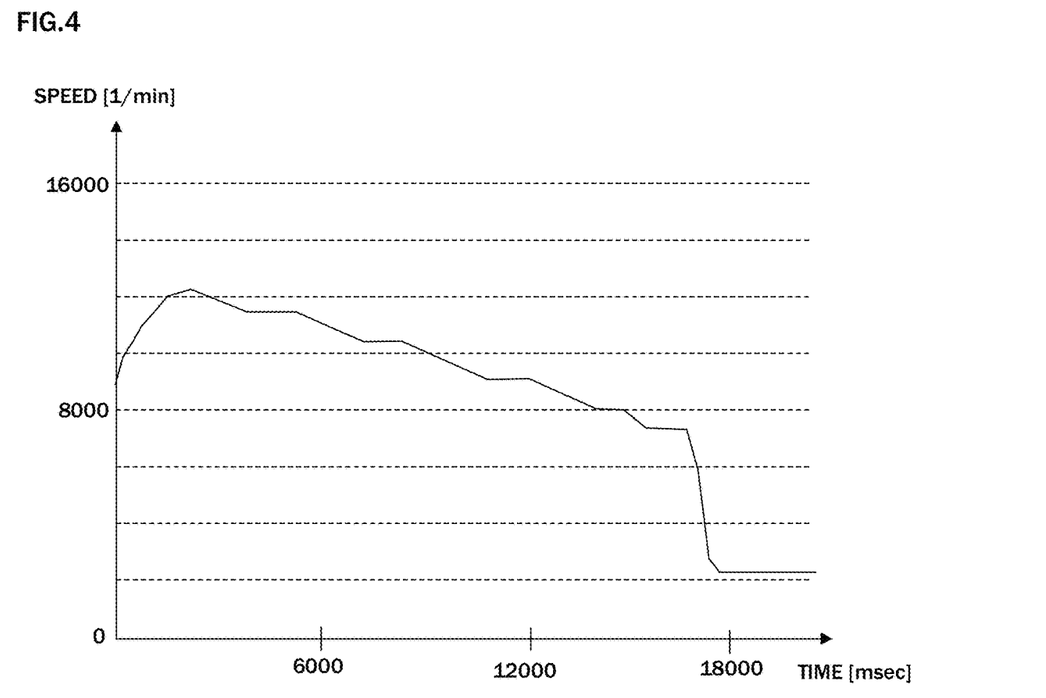
FIG. 4 shows another example of the detecting operation.

The control unit 110 turns into a diagnostic mode for diagnosing the state of the spindle based on a command from the NC program 210 or a command issued by an operator received through an operation board, not shown, or the input device 71. When the mode is changed into the diagnostic mode, the control unit 110 creates command data for operating the detection of the spindle at various rotational speeds, thereby controlling the rotation of the spindle based on the command data. In the detecting operation, the spindle is rotated at least at predefined various rotational speeds. The detecting operation may be a so-called sweep operation for continuously changing the rotational speed of the spindle as illustrated in FIG. 3, or may be an operation for maintaining the predefined various rotational speeds for each predetermined time, as shown in FIG. 4, when more accurate detection of the state of the spindle is desired. The time for maintaining the speed differs depending on materials and shapes of the spindle and the tool. However, it is sufficient if the time is adequate for causing increase in oscillation due to resonance (for example, 300 to 500 msec).

The drive unit information acquiring unit 120 is implemented in such a way that the CPU 11 included in the abnormality detection device 1 shown in FIG. 1 executes the system program read from the ROM 12, and then computation using the RAM 13 and the non-volatile memory 14 and control of the units of the machine tool 2 using the axis control circuit 30, the spindle control circuit 60 and the PLC 16 are primarily conducted by the CPU 11. The drive unit information acquiring unit 120 acquires information on the operating state of the spindle motor 62 while the control unit 110 causes the machine tool 2 to perform the detecting operation. The information on the operating state of the spindle motor 62 acquired by the drive unit information acquiring unit 120 may be, for example, a torque command for the spindle motor 62, or a current value or voltage value of the spindle motor 62, or information on a position, speed or others which is fed back from the spindle motor 62. The above-mentioned information can be acquired without providing a specific sensor or similar to the spindle motor 62, and shows an effect of vibration generated in the spindle motor 62. The drive unit information acquiring unit 120 acquires the information from the control unit 110, and stores the acquired information on the operating state of the spindle motor 62 as time-series data in the drive unit information storing unit 220.

The drive unit state determining unit 130 is implemented in such a way that the CPU 11 included in the abnormality detection device 1 shown in FIG. 1 executes the system program read from the ROM 12, and then computation using the RAM 13 and the non-volatile memory 14 is primarily conducted by the CPU 11. The drive unit state determining unit 130 is configured to analyze the information on the operating state of the spindle motor 62 stored in the drive unit information storing unit 220. The drive unit state determining unit 130 performs, for instance, frequency analysis or statistical analysis on the information about the operating state of the spindle motor 62 that is time-series data stored in the drive unit information storing unit 220. In the case of performing the frequency analysis, the drive unit state determining unit 130 may employ a known analytical technique, such as Fourier transform. In the case of performing statistical analysis, a known statistic, such as mean value, variance, standard deviation, degree of skew or kurtosis for a value measured when the spindle is rotated at each rotational speed may be calculated and analyzed. The drive unit state determining unit 130 conducts an analysis on whether the operating state of the spindle motor 62 is normal or not based on the information on the operating state of the spindle motor 62 thus analyzed and the information stored in the normal-time drive unit information storing unit 230.

The drive unit state determining unit 130 may conducts an analysis on whether the operating state of the spindle motor 62 is normal or not based on, for example, similarity between the information about the operating state of the spindle acquired in a state where the spindle is operating normally and the information about the operating state of the spindle motor 62 acquired by the drive unit information acquiring unit 120. The drive unit state determining unit 130 can determine that the state of the spindle is normal when the similarity is equal to or more than a predetermined threshold level. In a case where a determination is made about the normality/abnormality of the operating state of the spindle motor 62 based on the information about the operating state of the spindle, the normal-time drive unit information storing unit 230 stores information (e.g., frequency distribution or statistic) about the operating state of the spindle motor 62 acquired beforehand in a state where the spindle is operating normally.

Figure 5:
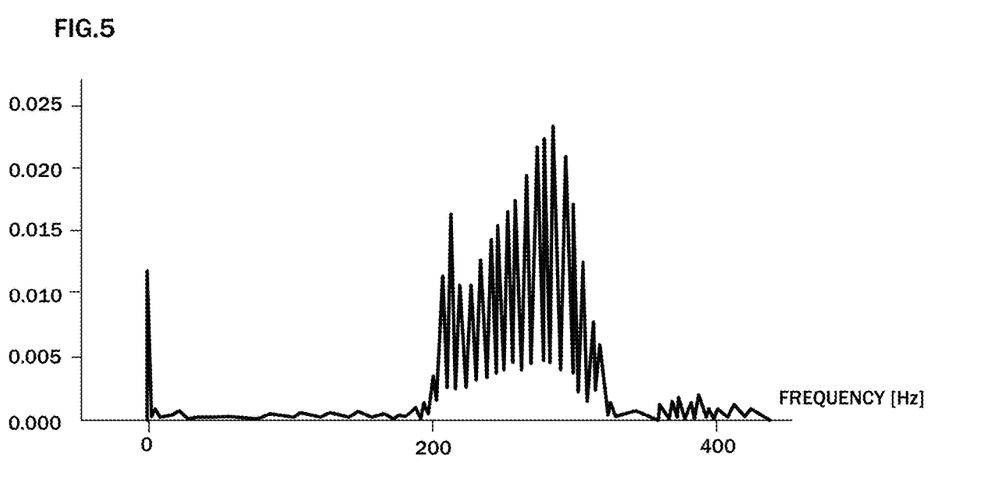
FIG. 5 shows an example of a frequency distribution of information indicating an operating state of a spindle at a normal time.
Figure 6:
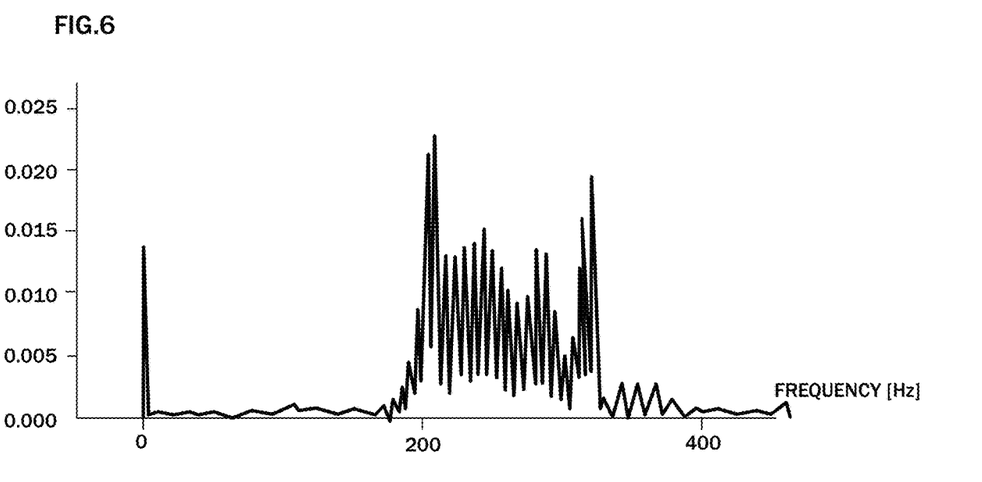
FIG. 6 shows an example of a frequency distribution of information indicating an operating state of the spindle in an abnormal time.

FIG. 5 shows an example of a frequency distribution of information (torque command) about an operating state of the spindle motor 62 at a normal time. In addition to that, FIG. 6 shows an example of a frequency distribution of information (torque command) about an operating state of the spindle motor 62 in a state where fine chips or something get caught. As shown in FIG. 6, there is a change in a resonance point in the spindle motor 62 operated in the state where the fine chips or something get caught, and a main frequency component of the information about the operating state is different from that at a normal time. Thus, the similarity between the frequency distributions may be admitted with respect to a predetermined number of frequencies with larger components when a sum of squared difference between amplitudes of the frequencies is equal to or less than a predetermined threshold value, by way of example. Alternatively, a degree of similarity may be calculated by using a general algorithm for calculating a degree of similarity between frequency distributions to thereby determine the similarity based on the calculated value.

Figure 7:
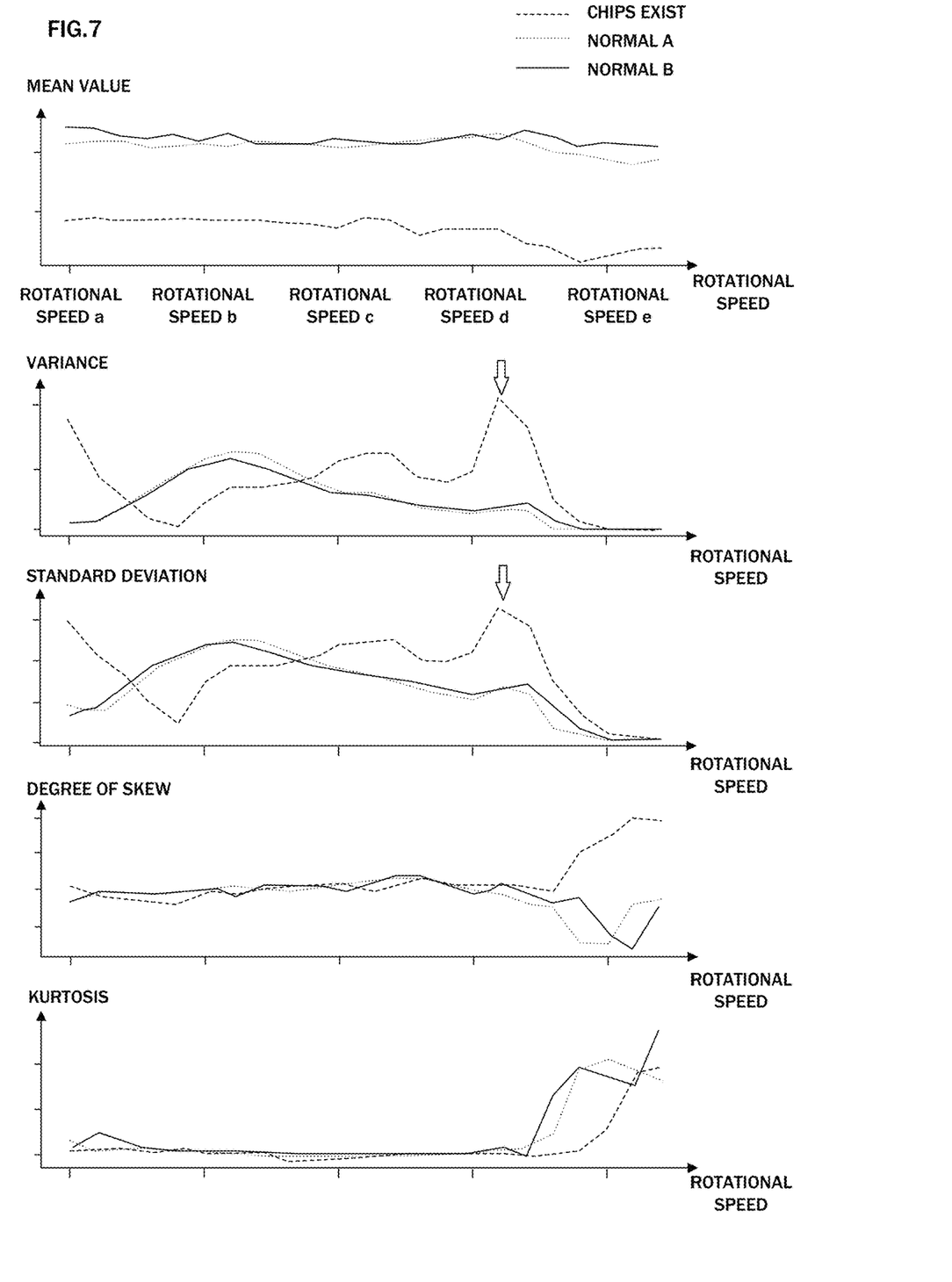
FIG. 7 shows an example of statistics of information indicating operating states of the spindle in the normal and abnormal times.

FIG. 7 shows examples of calculated statistics of mean values and others at various rotational speeds at normal times (normal times A and B) and at an abnormal time (there are chips) with respect to information (torque command) about an operating state detected when the spindle motor 62 is operated in stages at the respective rotational speeds. As shown in FIG. 7, the statistics at the respective rotational speeds have similar values and changing trends to each other at the normal time. By contrast, it is observed by an experiment that the statistics at the abnormal time have the different values and changing trends from those at the normal time. For example, when paying attention to variance values and standard deviations, there appears a peak (a portion indicated by a hollow arrow in the figure) at the abnormal time that cannot be found at the normal time. It is difficult to detect the fine chips getting caught when the drive unit is simply operated. However, when the drive unit is operated in stages at the various rotational speeds and the statistics are calculated at the respective rotational speeds to thereby compare the calculated statistics with those at corresponding rotational speeds at the normal time, the abnormality (that the chips get caught) can be detected easily.

Then, the normal-time drive unit information storing unit 230 may store a plurality of typical samples of the information about the operating state of the spindle motor 62 acquired in the state where the spindle is operating normally. In addition to that, the normal-time drive unit information storing unit 230 may store information about operating states of the spindle motor 62 where different tools are attached. The information about the operating state of the spindle motor 62 may differ even in the same normal time depending on an environment, an adherent on the spindle or the tool, types of the tools and others. Nevertheless, by storing samples of information about some operating states in advance, the drive unit state determining unit 130 can determine that the state of the spindle is normal if information about an operating state similar to any of the samples is acquired.

The drive unit state determining unit 130 may perform machine learning on the information (e.g., frequency distribution, statistics) about the operating state of the spindle acquired in the state where the spindle is operating normally, by way of example, and based on a learning model acquired by the machine learning and the information (e.g., frequency distribution, statistics) about the operating state of the spindle motor 62 acquired by the drive unit information acquiring unit 120, conduct an analysis on whether the operating state of the spindle motor 62 is normal or not. In this case, the normal-time drive unit information storing unit 230 stores in advance a learning model obtained by learning the information about the operating state of the spindle motor 62 acquired in the state where the spindle is operating normally. The learning model may be, for instance, a cluster set or autoencoder that has conducted unsupervised learning on information about an operating state of the spindle motor 62 at a normal time. Furthermore, the learning model may be a neural network, support vector machine or similar that has performed supervised learning by using information about an operating state of the spindle motor 62 at a normal time and information about an operating state of the spindle motor 62 at an abnormal time. For example, in a case of employing a cluster set, the drive unit state determining unit 130 can determine that the spindle is in the normal state when a distance between a cluster set stored in the normal-time drive unit information storing unit 230 and the information about the operating state of the spindle motor 62 acquired by the drive unit information acquiring unit 120 is in a range of a predetermined threshold value. Correspondingly, in a case of employing an autoencoder, neural network or support vector machine, a value obtained by calculation is compared with the predetermined threshold value, and based on a difference thus obtained, a determination is made whether the state is normal or not.

The notifying unit 140 is implemented in such a way that the CPU 11 included in the abnormality detection device 1 shown in FIG. 1 executes the system program read from the ROM 12, and then computation using the RAM 13 and the non-volatile memory 14 and input-output processing using the interface 18 or similar are primarily conducted by the CPU 11. The notifying unit 140 is configured to provide a predetermined notification to each unit when the drive unit state determining unit 130 does not determine that the spindle is in the normal state, i.e., when the drive unit state determining unit 130 determines that the spindle is in an abnormal state. When it is not determined that the spindle is in the normal state, the notifying unit 140 may, for instance, display on the display device 70 that a foreign matter gets caught in the spindle, or put out an alert indicating that the foreign matter gets caught in the spindle, or output a machine stopping signal to the control unit 110. Moreover, the notifying unit 140 may send a message indicating that the foreign matter gets caught in the spindle to a higher-level management device (e.g., fog computer or cloud server) via a network, not shown.

The abnormality detection device 1 according to the embodiment having the above-described configuration performs an analysis on the information about the operating state of the spindle motor 62, thereby enabling to make a detection with high accuracy even when a tiny foreign matter gets caught in the spindle. In a diagnose mode for diagnosing an abnormality in the spindle, a detecting operation to rotate the spindle at predefined various rotational speeds is performed. In this case, the rotation is maintained at the various rotational speeds for a predetermined time to facilitate the detection of a deviation of a resonance point and a change in a statistic. Furthermore, by analyzing a difference from the normal state based on the frequency distribution of the information about the operating state and the change in the statistic at each rotational speed, it is possible to detect a slight change that is hard to detect simply by analyzing time-series data as is.

Whilst the embodiment of the present invention has been illustrated in the foregoing, the present invention is not limited to the above-described embodiments and may be implemented in various aspects with modifications made thereto as appropriate.

For example, in the above embodiment, the information about the operating state of the spindle motor 62 driving the spindle is analyzed to detect the difference from the normal state, and thereby the slight change, such as tiny foreign matters getting caught in the spindle, is detected. Alternatively, a similar method may be applied to detect information about an operating state of the servomotor 50 that drives a feed axis and a ball screw nut for moving the spindle. Thus, in a case where tiny foreign matters get into the drive unit driven by a motor of the machine tool, e.g., a case where tiny chips, metallic powder or others get between a guide face of the feed axis for moving the spindle and the drive unit and do not come out from there, or a case where the tiny chips, the metallic powder or others get caught in a groove of the ball screw nut for moving the spindle, a slight change can be detected.

REFERENCE SIGNS LIST

1 Abnormality Detection Device
2 Machine Tool
11 CPU
12 ROM
13 RAM
14 Non-Volatile Memory
15, 18, 19 Interface
16 PLC
17 I/O Unit
22 Bus
30 Axis Control Circuit
40 Servo Amplifier
50 Servomotor
60 Spindle Control Circuit
61 Spindle Amplifier
62 Spindle Motor
63 Position Coder
70 Display Device
71 Input Device
72 External Device
110 Control Unit
120 Drive Unit Information Acquiring Unit
130 Drive Unit State Determining Unit
140 Notifying Unit
210 NC Program
220 Drive Unit Information Storing Unit
230 Normal-Time Drive Unit Information Storing Unit

The invention claimed is:

1. An abnormality detection device for detecting a foreign matter getting caught in a drive unit which is driven by a motor in a machine tool, comprising:
   a control unit that causes the motor which drives the drive unit at various rotational speeds to perform a detecting operation based on a command for diagnosing a state of the drive unit;
   a drive unit information acquiring unit that acquires a control command for the motor driving the drive unit or a feedback signal from the motor driving the drive unit as information indicating a moving state of the drive unit during the detecting operation;
   a drive unit state determining unit that analyzes the information indicating the moving state of the drive unit, which is the control command for the motor driving the drive unit or the feedback signal from the motor driving the drive unit acquired by the drive unit information acquiring unit, to obtain an analysis result, and based on the analysis result, makes a determination about the state of the drive unit; and
   a notifying unit that provides a notification that the state of the drive unit is different from a normal state based on a determination result made by the drive unit state determining unit to indicate the foreign matter getting caught in the drive unit.

2. The abnormality detection device according to claim 1, wherein the control unit is configured to control the rotational speeds in the detecting operation to be maintained for a preset certain time.

3. The abnormality detection device according to claim 1, wherein the drive unit state determining unit is configured to make a determination about the state of the drive unit based on similarity between a result of a frequency analysis on a control command for the motor driving the drive unit or a feedback signal from the motor driving the drive unit which are acquired by the drive unit information acquiring unit and a result of a frequency analysis on a control command for the motor driving the drive unit or a feedback signal from the motor driving the drive unit which are acquired in advance when causing the motor driving the drive unit to perform the detecting operation in a normal time.

4. The abnormality detection device according to claim 1, wherein the abnormality detection device stores in advance a learning model acquired by conducting machine learning on data about a result of frequency analysis on a control command for the motor driving the drive unit or a feedback signal from the motor driving the drive unit which are acquired in advance when causing the motor driving the drive unit to perform the detecting operation in a normal time, and
   the drive unit state determining unit makes a determination about a state of the drive unit based on the learning model and a result of frequency analysis on the control command for the motor which drives the drive unit or the feedback signal from the motor for driving the drive unit acquired by the drive unit information acquiring unit.

5. The abnormality detection device according to claim 1, wherein the drive unit state determining unit makes a determination about a state of the drive unit based on similarity between a result of calculation of statistics at the respective rotational speeds with respect to the control command for the motor driving the drive unit or the feedback signal from the motor driving the drive unit acquired by the drive unit information acquiring unit and a result of calculation of statistics at the respective rotational speeds with respect to a control command for the motor driving the drive unit or a feedback signal from the motor driving the drive unit which are acquired in advance when causing the motor driving the drive unit to perform the detecting operation in a normal time.

6. The abnormality detection device according to claim 1, wherein the abnormality detection device stores in advance a learning model acquired by conducting machine learning on data about a result of calculation of statistics at the respective rotational speeds with respect to a control command for the motor driving the drive unit or a feedback signal from the motor driving the drive unit which are acquired in advance when causing the motor driving the drive unit to perform the detecting operation in a normal time, and
   the drive unit state determining unit makes a determination about a state of the drive unit based on the learning model and a result of calculation of statistics at the respective rotational speeds with respect to the control command for the motor driving the drive unit or the feedback signal from the motor driving the drive unit acquired by the drive unit information acquiring unit.

* * * * *